March 15, 1966 J. P. HARRIS 3,240,409

DATA REGISTERING DEVICE

Filed May 22, 1964 8 Sheets-Sheet 1

INVENTOR.
JOSEPH P. HARRIS

BY Gordon Wood.

ATTORNEY

INVENTOR.
JOSEPH P. HARRIS
BY
Gordon Wood
ATTORNEY

March 15, 1966 J. P. HARRIS 3,240,409

DATA REGISTERING DEVICE

Filed May 22, 1964 8 Sheets-Sheet 3

INVENTOR.
JOSEPH P. HARRIS

BY Gordon Wood

ATTORNEY

March 15, 1966 J. P. HARRIS 3,240,409

DATA REGISTERING DEVICE

Filed May 22, 1964 8 Sheets-Sheet 4

INVENTOR.
JOSEPH P. HARRIS

BY Gordon Wood

ATTORNEY

March 15, 1966 J. P. HARRIS 3,240,409

DATA REGISTERING DEVICE

Filed May 22, 1964 8 Sheets-Sheet 5

INVENTOR.
JOSEPH P. HARRIS

BY Gordon Wood

ATTORNEY

DATA REGISTERING DEVICE

INVENTOR.
JOSEPH P. HARRIS
BY
Gordon Wood
ATTORNEY

March 15, 1966 J. P. HARRIS 3,240,409

DATA REGISTERING DEVICE

Filed May 22, 1964 8 Sheets-Sheet 7

INVENTOR.
JOSEPH P. HARRIS

BY Gordon Wood

ATTORNEY

March 15, 1966 J. P. HARRIS 3,240,409

DATA REGISTERING DEVICE

Filed May 22, 1964 8 Sheets-Sheet 8

INVENTOR.
JOSEPH P. HARRIS

BY Gordon Wood.

ATTORNEY

United States Patent Office 3,240,409
Patented Mar. 15, 1966

3,240,409
DATA REGISTERING DEVICE

Joseph P. Harris, 15 Terrace Walk, Berkeley, Calif.
Filed May 22, 1964, Ser. No. 369,435
11 Claims. (Cl. 225—93)

This invention relates to devices for the manual registering of data on machine-processable record cards. The principle on which the present invention operates is similar in many respects to that involved in application Serial No. 236,931 dated Nov. 13, 1962. As in the copending application the present invention will be described with reference to a typical voting operation but it will be understood that the invention lends itself to other uses such as polls, examinations and other applications where it is desired to register a relatively great amount of information in a relatively small space.

The main object of the present invention is to provide a data registering device which is extremely simple to use and relatively inexpensive to construct.

Another object of the invention is the provision of a device which lends itself to use in voting, especially when the number of candidates and propositions to be voted on are numerous and where the data registered can be processed by high speed computers.

Other objects and advantages will be apparent from the following specification and drawings.

Figure 1:
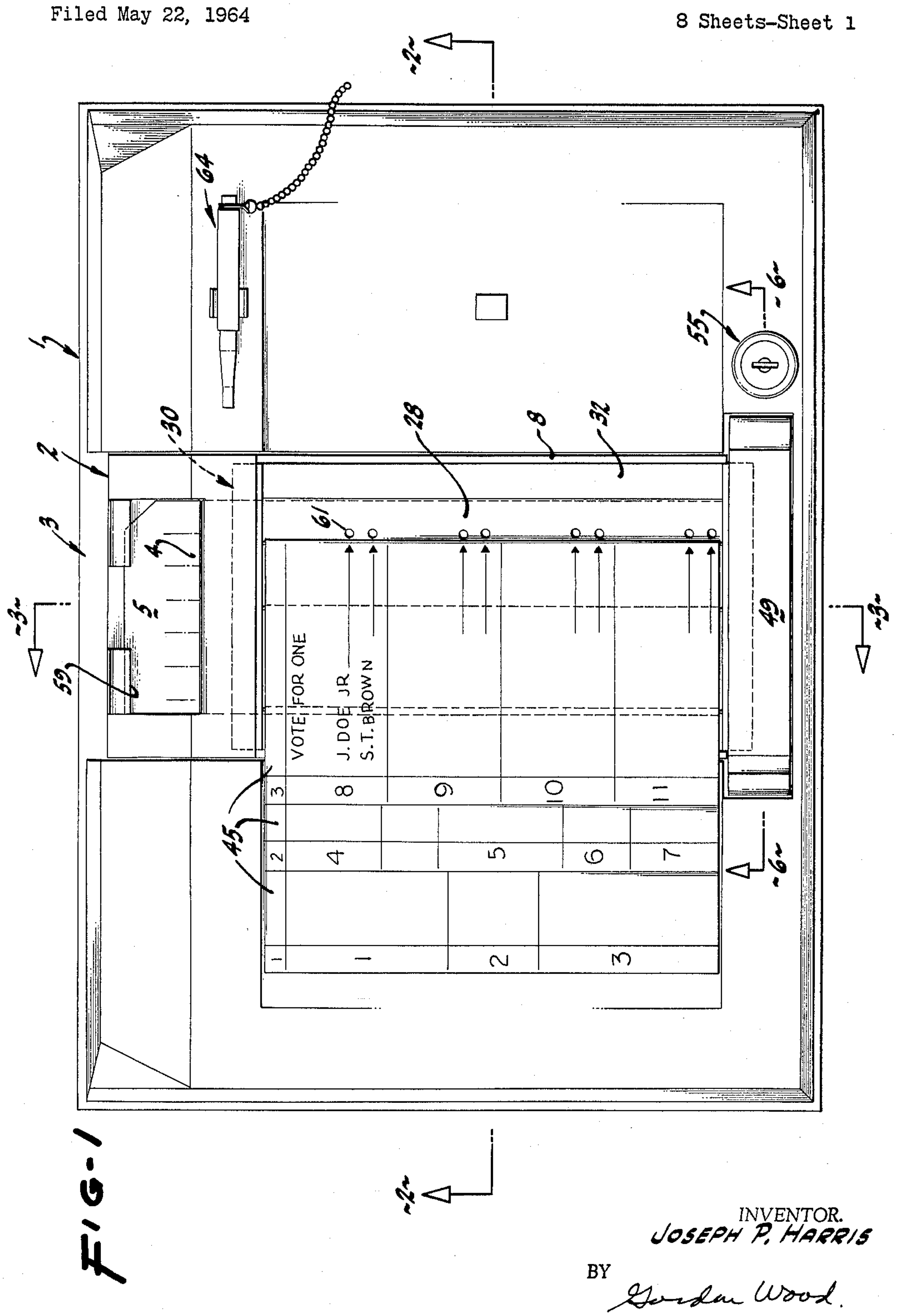
FIG. 1 is a top plan view of the preferred form of the invention showing the leaves containing the reference indicia in position to permit the user to commence the selection process on the first column of index point areas.
Figure 2:
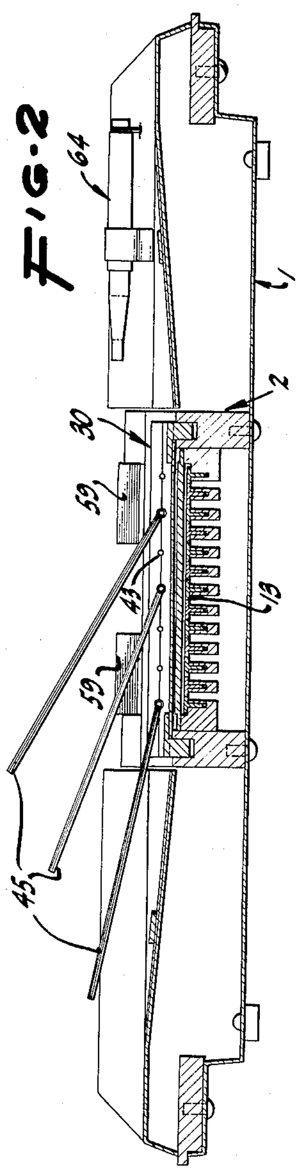
FIG. 2 is a transverse cross section as taken in a plane indicated by lines 2—2 of FIG. 1 and showing the leaves in partly elevated position.

One of the preferred forms of the invention is shown in FIGS. 1 through 9 from which it is seen that the device includes a sheet metal housing generally designated 1 and a base generally designated 2 positioned in said housing centrally of the same. The base 2 includes a head end 3 which is provided with a longitudinally directed slot 4 through which the record card indicated at 5 in FIGS. 3 and 4 may be passed into the device.

Figure 4:
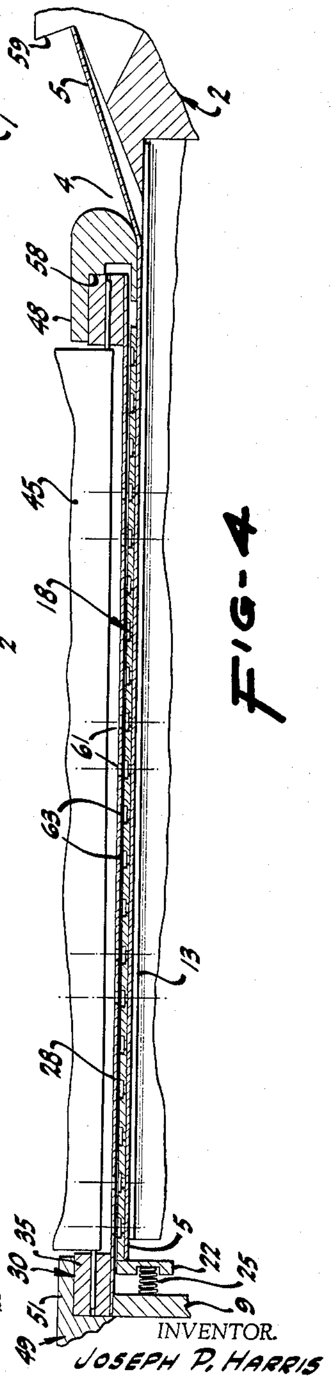
FIG. 4 is a view similar to FIG. 3 but with the card in operative position in the device.
Figure 8:
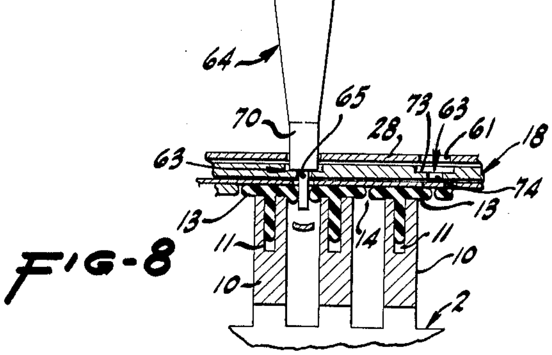
FIG. 8 is a greatly enlarged fragmentary section of the device showing the stylus punching out a chip.

The base 2 includes a pair of longitudinally extending side members 7, 8 and an inner end 9 extending perpendicular to side members 7, 8. Between the inner end 9 and the head 3 of the base 2 the latter is provided with integral ribs 10 (FIG. 8) which extend longitudinally of the base 2. Said ribs 10 are each provided with an upwardly opening slot 11. The slots 11 are adapted to receive the vertically extending legs of parallel T-shaped die strips 13 which are similar to those shown in Patent No. 3,007,620 dated Nov. 7, 1961. The horizontally extending portions of the T-shaped strips 13 are spaced slightly apart to define longitudinally extending slits 14 which are adapted to receive therethrough the chips of the record card during the card punching operation which will be described later on in greater detail. As best seen in FIGS. 4 and 8, when the card 5 is placed in the device the same rests on the horizontally disposed portions of die strips 13 in a manner similar to that shown in Patent No. 3,007,620.

Figure 3:
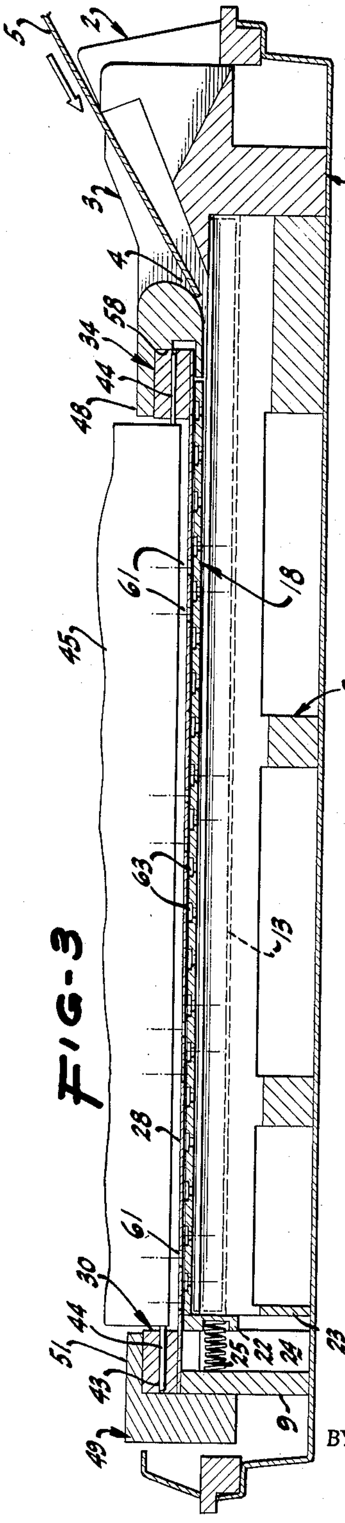
FIG. 3 is a longitudinal section taken in a plane indicated by lines 3—3 of FIG. 1 and showing the record card about to be inserted in the device.
Figure 9:
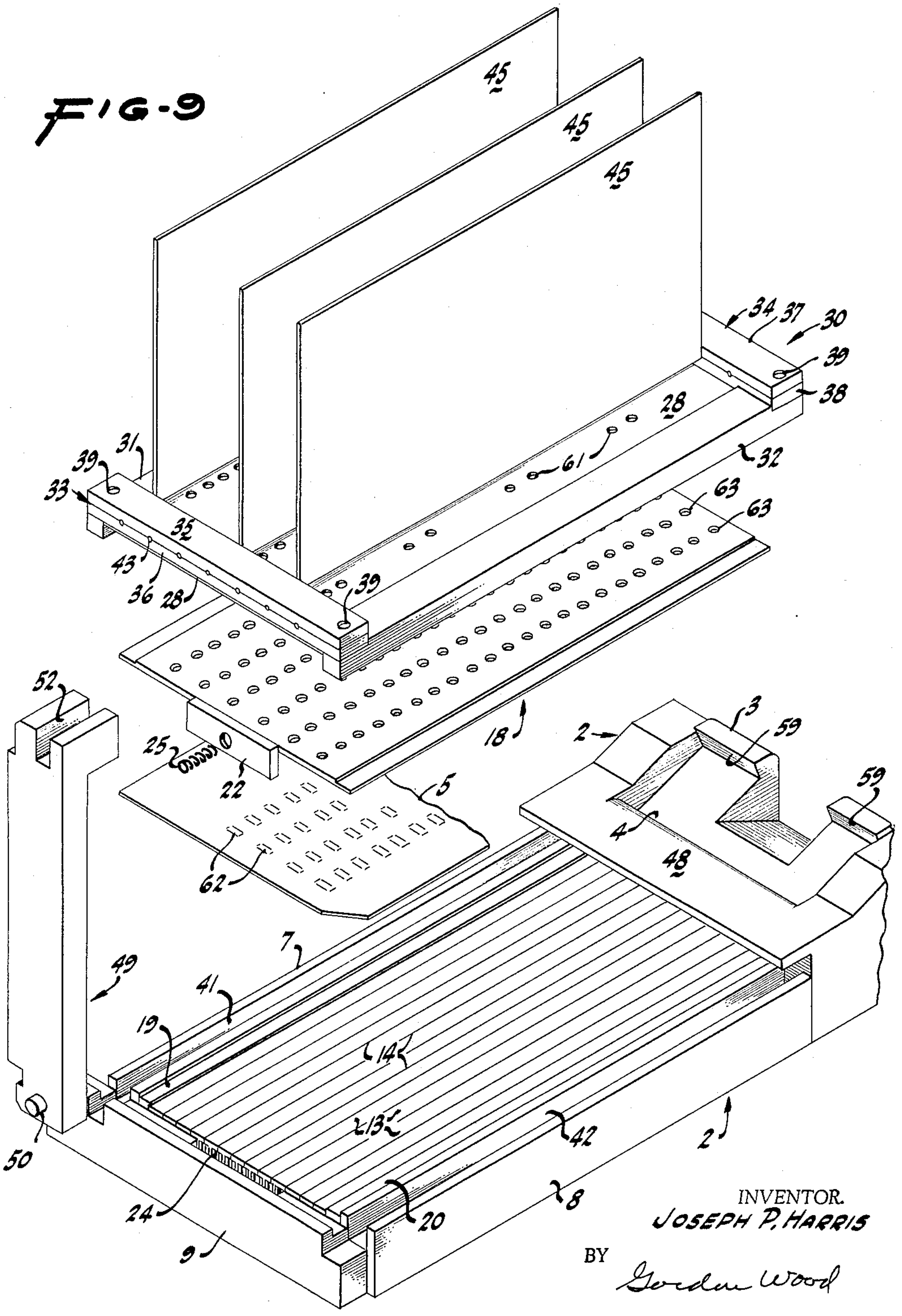
FIG. 9 is an exploded perspective of the essential elements of the device.
Figure 10:
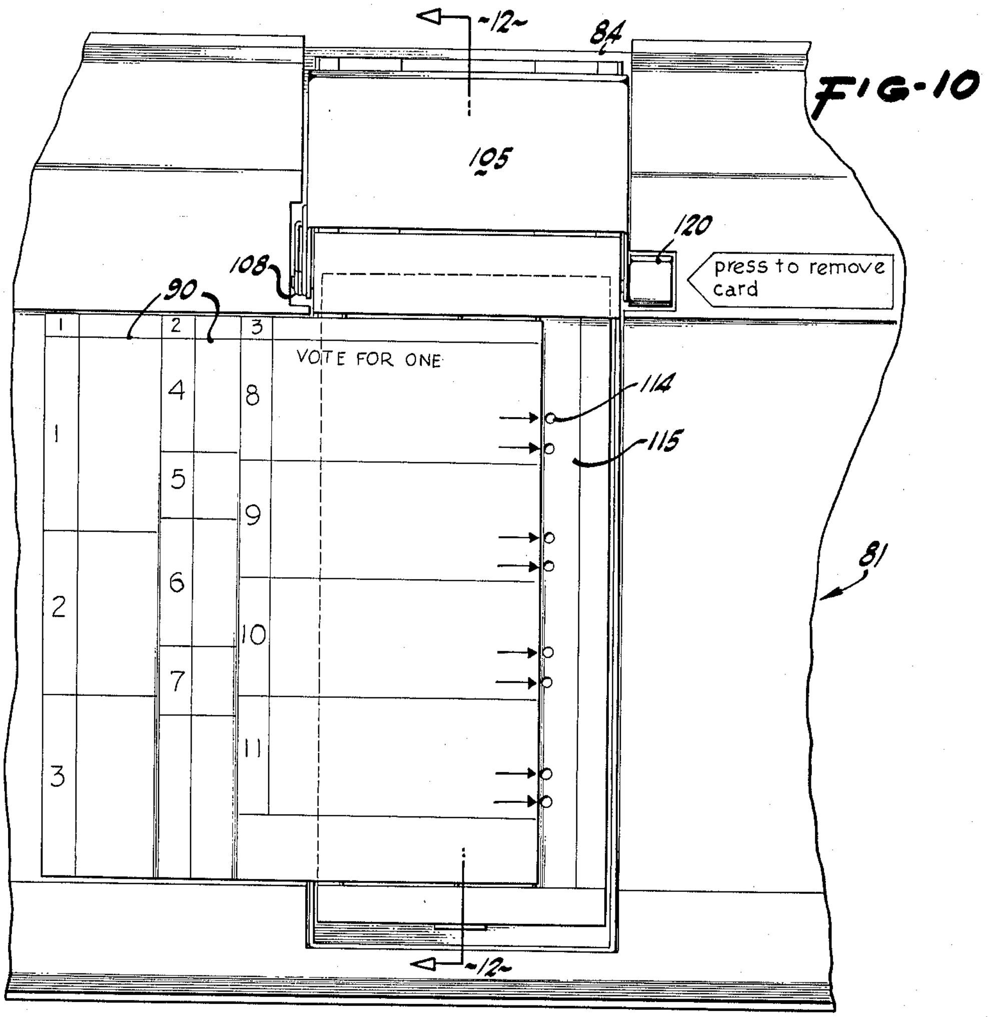
FIG. 10 is a fragmentary top plan view of the central portion of a modified form of the invention.

Spaced outwardly from die strips 13 is an inner template generally designated 18 (FIG. 9) which is slidably disposed along its opposite longitudinally extending margins on a pair of support guides 19, 20 formed on base 2 (FIG. 9). At the inner end of template 18 the same is provided with a transverse depending flange 22 which is adapted to lie alongside an internal wall 23 of the base 2 (FIG. 3). Said internal wall 23 is spaced from the inner end 9 of the base to provide a recess 24 adapted to receive therein the flange 22 of the inner template 18. The flange 22 is urged against the internal wall 23 by a compression spring 25 which extends between said flange and the inner end 9 (FIG. 3). As best seen in FIG. 4, the above described structure permits the inner or bottom end of the card 5 to engage the flange 22 and urge it toward inner end 9 of the base against the resiliency of spring 25 for a purpose to be described later on in greater detail.

Positioned above the inner template 18 is an outer template 28 which is fixedly secured as by adhesive to the underside of a removable frame generally designated 30 (FIG. 9). Said frame 30 includes a pair of longitudinally extending side members 31, 32 and a pair of end members 33, 34. End member 33 consists of a pair of upper and lower bars 35, 36, respectively, which are secured together and to the adjacent ends of side members 31, 32 by means of machine screws 39. Similarly, end member 34 comprises upper and lower bars 37, 38 secured together in the same manner to side members 31, 32. The above noted outer template 28 is secured at its margin along the undersides of the lower bars 36, 38 and along the side members 31, 32. The side members 7, 8 of the base 2 are provided with longitudinally extending slots 41, 42 for receiving therein the side members 31, 32 of the frame 30.

Figure 5:
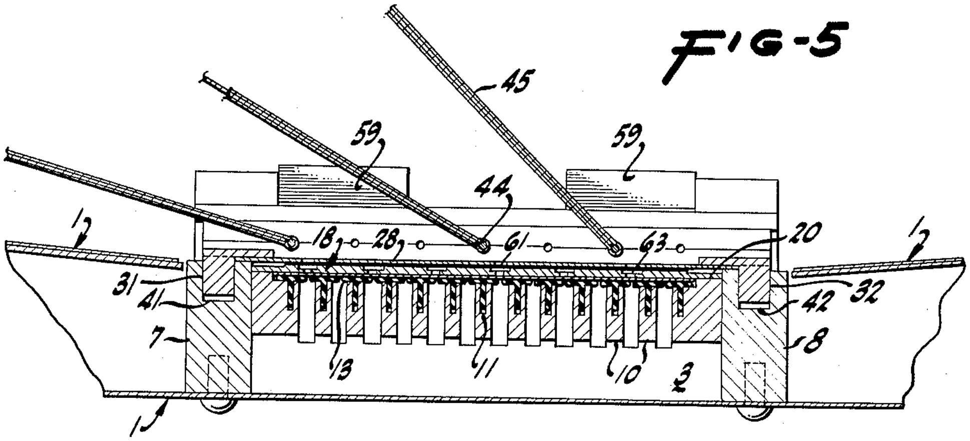
FIG. 5 is an enlarged transverse section showing greater detail than FIG. 2.

Upper and lower bars 35, 36 of the end members 33 and upper and lower bars 37, 38 of end member 34 of frame 30 are provided with grooves 43 which are in opposed relation so as to form bearings for wires 44 which act as hinge elements for the leaves 45 (FIG. 5). As best seen in FIG. 1, the leaves 45 are adapted to be imprinted with indicia referred to by the user in making the selections permitted by the present invention.

Figure 6:
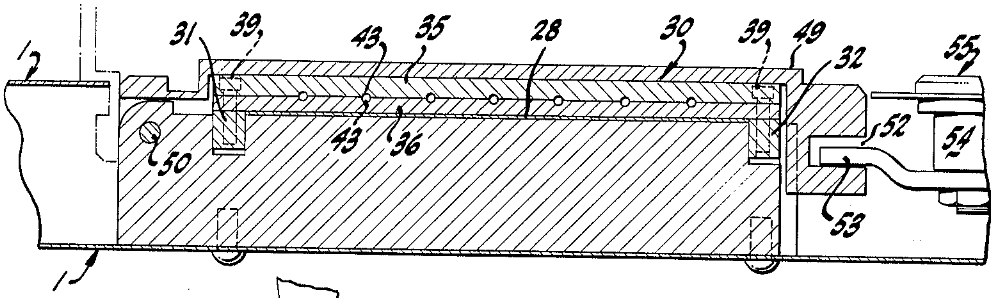
FIG. 6 is a transverse section taken in a plane indicated by lines 6—6 of FIG. 1 and showing the removable frame of the device in locked position.

It is desirable to be able to lock the frame 30 in the machine against shifting and against unauthorized removal thereof. To this end the base 2 is provided with a transversely extending flange 48 overhanging die strips 13 and under which is received the end member 34 of frame 30 (FIG. 3). From FIG. 9 it will be apparent that the frame 30 with the outer template 28 thereon and carrying the leaves 45 may be slid onto the base 2 with the end member 34 sliding under the overhanging flange 48. In order to retain the frame 30 in this position a swinging arm generally designated 49 (FIG. 9) is provided. This arm 49 is pivoted at one end to base 2 by means of pin 50 and is adapted to be swung upwardly to the position of FIG. 9 when it is desired to insert the frame 30 and inner template 18. The arm 49 may then be swung downwardly to the position of FIG. 3 in which position a horizontally extending flange portion 51 of said arm engages the upper side of end member 33 of frame 30 thus securing it against removal. As best seen in FIG. 6, arm 49 is provided at its end opposite pivot 51 with a slot 52 which is adapted to receive therein a locking detent 53 carried by the cylinder 54 of a key actuated locking unit 55 (FIG. 1). The locking unit 55 is fixedly secured to the housing 1 and thus provides an effective means for preventing unauthorized disassembly of the above described structure.

With reference to FIGS. 3 and 4 it is seen that the base 2 is formed under the overhanging flange 48 to provide a shoulder 58 against which the end member 34 of frame 30 is adapted to be abutted. When arm 49 is moved to its holding position, the frame 30 is exactly positioned relative to the base 2 so that the position of template 28 is accurately predetermined relative to the record card 5. Since card 5 and template 28 must register accurately, the base 2 is formed at its head end with a pair of shoulders 59 (FIGS. 4, 9) against which the top end of card 5 is abutted when the latter is in its proper position relative to the device.

Template 28 is provided with a plurality of apertures 61 which are adapted to register with the chips 62 (FIG. 9) formed on card 5 when both the frame 30 and the card 5 are in their proper position relative to the device as described above. In other words, the chips 62 could be punched out of the card 5 by a stylus passed through the holes 61 in template 28 as disclosed in Patent No. 3,007,620. However, in order to ensure that the punching operation is not performed until the card 5 is in its proper position relative to the template 28, the inner template 18 is mounted so that the apertures 63 therein are offset from the holes 61 in template 28 and from the chips 62 in card 5 when said inner template 18 is in its normal inoperative position. Thus, referring to FIG. 3, spring 25 urges said inner template 18 into the normal position in which apertures 63 are offset from apertures 61 in template 28 but apertures 63 are brought into registration with apertures 61 when the card 5 is inserted into the device and, moving the template 18 against the urgency of spring 25, assumes the position shown in FIG. 4 with the top edge of the card in abutment with shoulders 59. By this structure erroneous results are completely obviated because the punching element cannot reach the card 5 until the latter is in its proper position.

Figure 7:
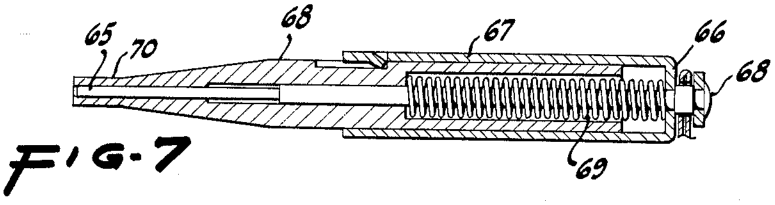
FIG. 7 is a side elevation of the stylus adapted for use with the device.

The preferred form of stylus to be used with the present invention is best seen in FIGS. 7, 8 and comprises an elongated pin 65 which is secured at one end to the closed end 66 of tubular member 67. Telescopically received within tubular member 67 is inner member 68 which is urged outwardly of member 67 by compression spring 69. Pin 65 is slidably received through the restricted cylindrical end 70 of inner member 68 and, in the normal position of FIG. 7, said pin 65 is entirely received within said end 70. However, upon movement of outer member 67 toward inner member 68 pin 65 is projected, as best seen in FIG. 8.

The cylindrical end 70 of member 68 is adapted to be received within a cylindrical upwardly opening recess 73 which forms a portion of the aperture 63 and which recess communicates with a substantially smaller hole 74 adapted to slidably receive pin 65 therethrough. By this structure it will be apparent that the recess 73 in template 18 ensures proper positioning of the complementarily formed end 70 of member 68 of the stylus so that upon downward movement of the outer member 67 the pin 65 projects through hole 74 and through card 5 pushing the associated chip out of the same.

In operation, the card 5 is inserted into the device as described above and a stylus is applied to the outer template 28 with the cylindrical end 70 of the inner member 68 passing through the selected aperture 61 of outer template 28 and into the cylindrical recess 73 of the corresponding aperture 63 in inner template 18. The outer member 67 of the stylus is then depressed to push the pin 65 against the corresponding chip 62 on card 5 for disengaging said chip and forcing it through the slits 14 between the die strips 13. This process is repeated for all of the selections corresponding to the releated indica on the first leaf 45 and then said first leaf is turned to expose the next leaf 45 and appropriate selections are again made in the manner described in the copending application Serial No. 236,931.

After all of the selections have been made or the votes cast, the card 5 is then removed from the device which is then ready to process the next card. The card 5 with selected chips removed is then ready for processing with other similar cards in a high speed computer.

A modified form of the invention is disclosed in FIGS. 10 through 17. In this case a somewhat similar housing 81 is provided and a die block 82 and die strips 83 similar to those previously described may be secured within housing 81 for the same purpose. The housing 81 may be formed of sheet metal to provide a head portion 84 which together with a down-turned flange 85 (FIGS. 12, 13) cooperates to form a mouth through which the card 86 may be inserted into the device.

A frame generally designated 89 adapted to support swingably mounted leaves 90 may be provided having somewhat the same structure as frame 30 previously described. In this case, however, a latch element 92 depends from and is integrally secured to the inner end of frame 89 so as to cooperate with a catch 93 on housing 81 for holding the frame in position. Proper positioning of the frame 89 is achieved by means of a shoulder 95 formed on housing 81 and against which the end of the frame 89 opposite the catch 93 may be abutted (FIG. 12).

Figures 12, 13, 14:
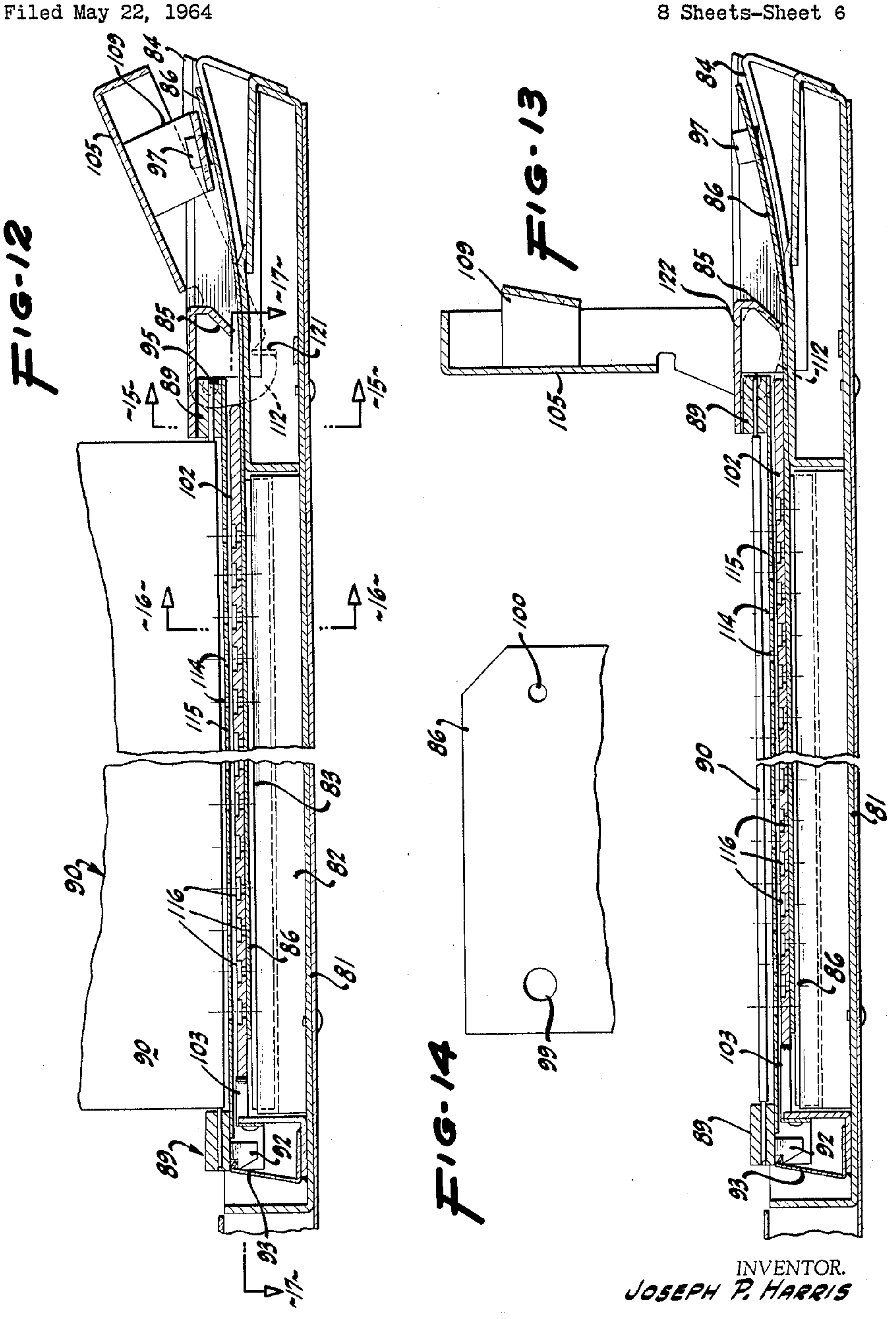
FIG. 12 is a longitudinal section taken in a plane indicated by lines 12—12 in FIG. 10.
FIG. 13 is a view similar to FIG. 12 but with the door in raised position.
FIG. 14 is a fragmentary top plan view of the record card used with the device of FIG. 10.
Figure 15:
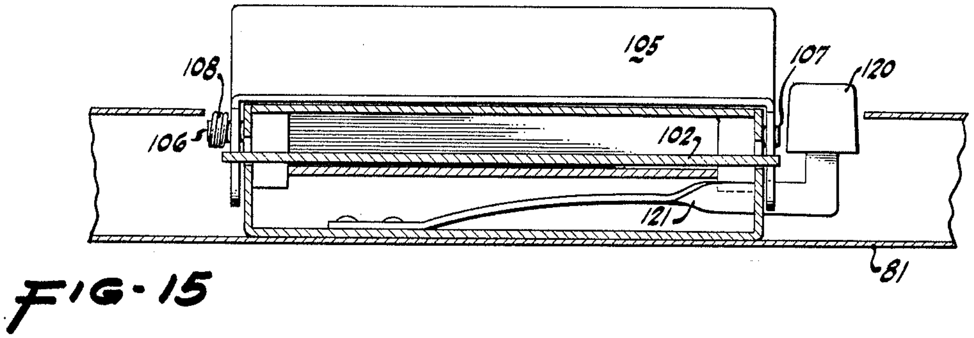
FIG. 15 is a section taken in a plane indicated by lines 15—15 of FIG. 12. In this view the outer template and leaf frame are removed for clarity.
Figure 16:
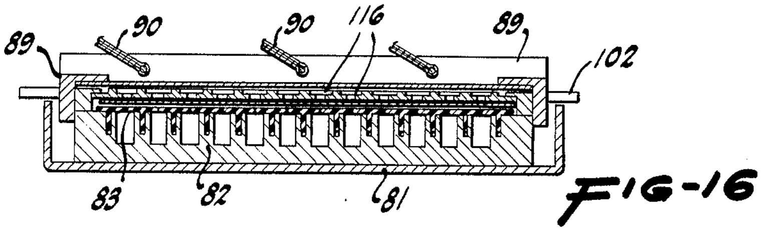
FIG. 16 is a section taken in a plane indicated by lines 15—15 of FIG. 12.

In this modified form of the invention correct positioning of the card 86 is achieved through a pair of upwardly extending pins 97, 98 which are adapted to be received through complementarily formed holes 99, 100 formed in card 86 (FIG. 14).

Figure 17:
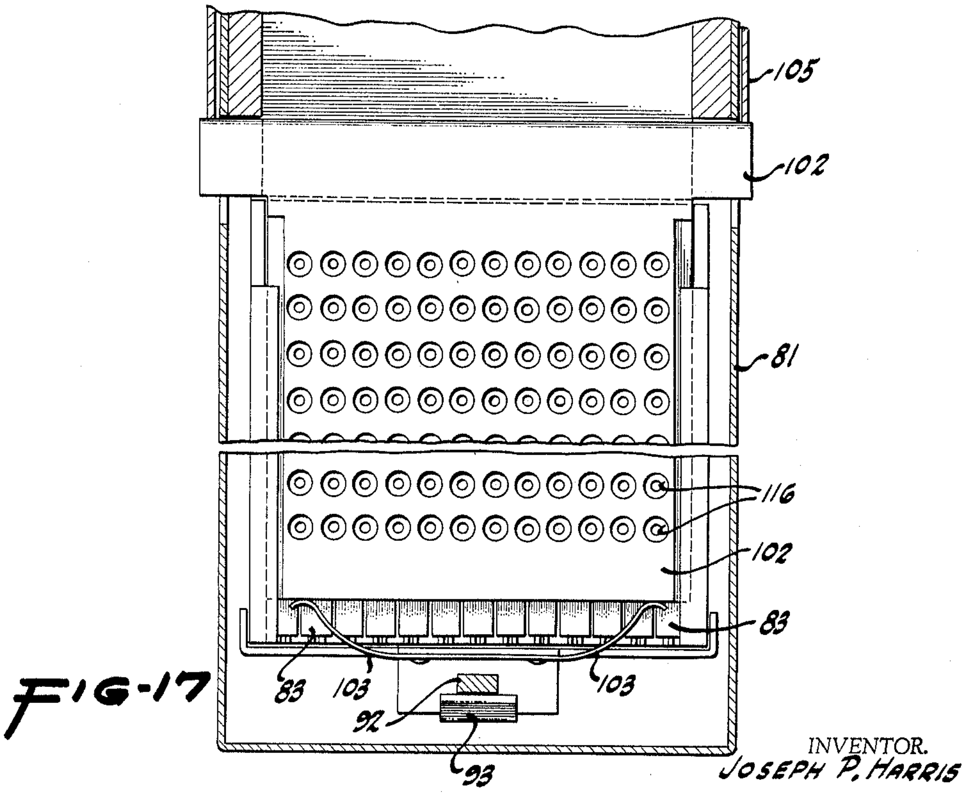
FIG. 17 is a horizontal section taken in a plane indicated by lines 17—17 of FIG. 12.

The inner template 102 is slidably supported, as before, in housing 81 and is urged toward the top end of the device by leaf springs 103 (FIG. 17).

Figure 11:
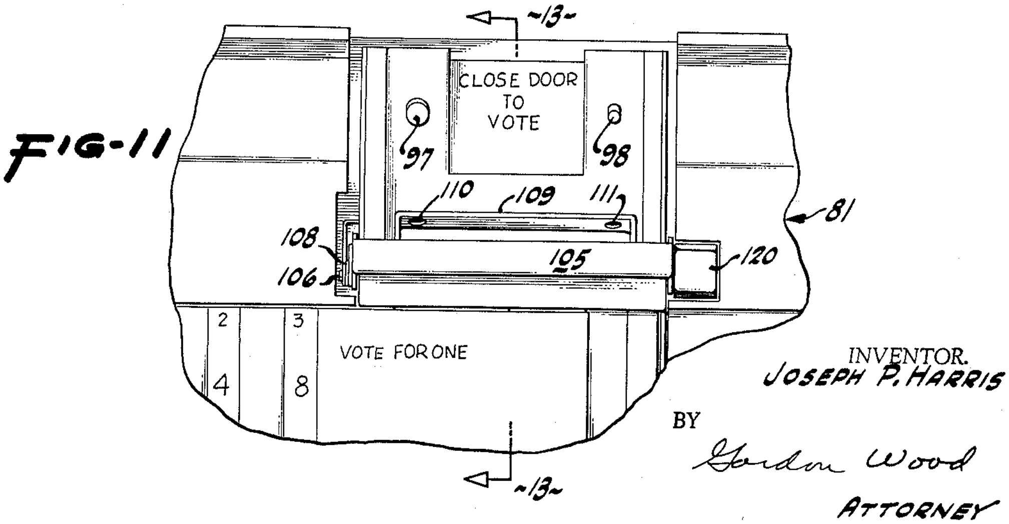
FIG. 11 is a view similar to FIG. 10 showing the door in raised position.

At the head end of the device of FIGS. 10 through 17 there is provided a door 105 that is swingably mounted by means of pins 106, 107 to the housing 81. A torsion spring 108 surrounding pin 106 serves to urge the door 105 upwardly to an open position at all times (FIGS. 12, 13). Integral with door 105 is a U-shaped bracket 109 which, as best seen in FIG. 11, is provided with apertures 110, 111 adapted to receive therethrough the pins 97, 98, respectively. By this structure it will be noted that the door 105 cannot be closed unless the card 86 is properly positioned relative to the housing 81.

Adjacent the pivot of door 105 the latter is provided with a cam surface 112 adapted to engage the adjacent end of inner template 102 (FIGS. 12, 13). When the door 105 is in its open position it will be seen that the apertures 114 in outer template 115 are offset from the corresponding apertures 116 in inner template 102. However, when door 105 is closed the camming surface 112 cooperates with the adjacent end of inner template 102 to shift the latter against the urgency of leaf springs 103 toward the bottom end of the device. Cam surface 112 is so formed as to exactly position inner template 102 with its apertures 116 in registration with the apertures 114 of outer template 115 and with the corresponding chips to be punched out of card 86.

When it is desired to remove the card 86 the user presses downwardly on a button 120 to which is secured a leaf spring detent 121 which, as best seen in FIGS. 12 13, is adapted to be received within recess 122 formed on door 105. When detent 121 is released from recess 122 the door 105 springs upwardly under the urging of torsion spring 108 and the device is ready for the insertion of the next card.

It will be apparent that the above described modified form of the invention provides an extremely exact means for positioning the card 86 and at the same time provides accuracy in aligning the templates with the chips of said card.

It is also contemplated that the use of a pin such as pin 99 may be incorporated in the structure of FIG. 1. In such a case the pin would be positioned unsymmetrically relative to the card and the base so that it is impossible to insert the card reversed from its proper position.

Figure 18:
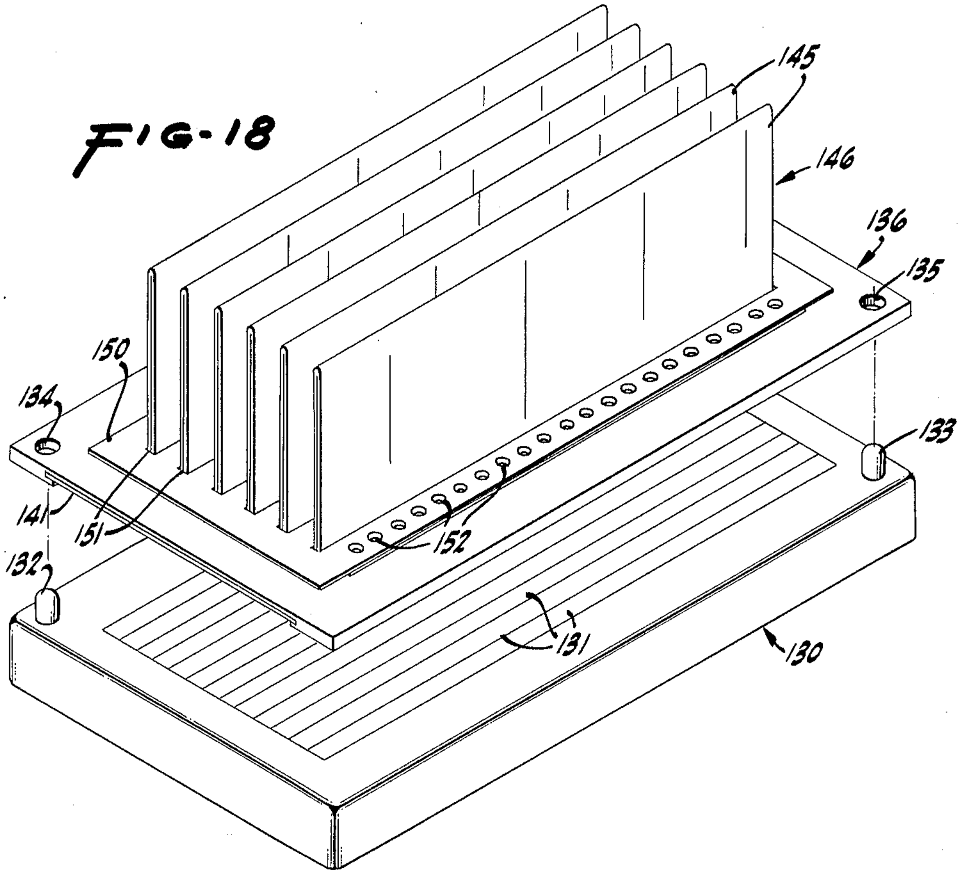
FIG. 18 is an exploded perspective of another modified form of the invention.
Figure 19:
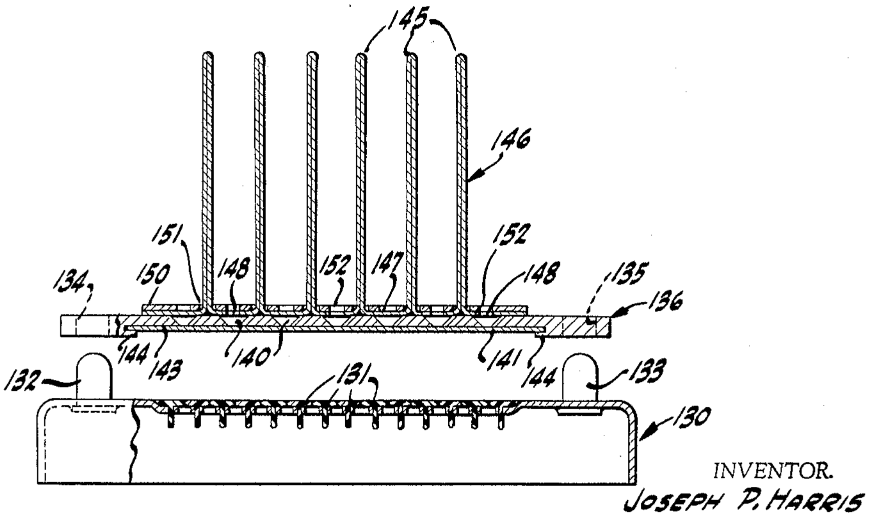
FIG. 19 is a sectional view of the device of FIG. 18.

Still another form of the invention is shown in FIGS. 18, 19. This simplified form lends itself to use when it is unobjectionable to combine the template and the leaves constituting the ballot pages in a single unit together with the record card. This form of the invention contemplates use of the device of FIGS. 18 and 19 in a voting operation wherein the voter is provided with an assembly that includes ballot pages in the form of hinged leaves, a template, and a record card and wherein the entire assembly is submitted to the voting authorities for subsequent removal of the record cards and counting of the same by high speed electronic computers.

In this form of the invention a base generally designated 130 is provided with a plurality of die strips 131 forming a structure somewhat similar to that disclosed in Patent No. 3,007,620. Integral with base 130 are a pair of diagonally spaced apart positioning pins 132, 133 which are adapted to be received through complementarily formed positioning holes 134, 135 in template generally designated 136. The template 136 is provided with a plurality of frustoconical apertures 140 in registration with the chips in record card 141. As best seen in FIG. 19, the template 136 is formed with a downwardly opening recess 143 for receiving record card 141 therein. In addition, longitudinally extending flanges 144 are formed alongside said recess 143 so as to retain card 141 and permit the latter to be snapped into place as shown in FIG. 19.

Secured to template 136 are a plurality of leaves 145 on which is printed the indicia which permits the user to make the appropriate selections by punching through apertures 140 in template 136. The leaves 145 are formed from a single sheet 146 which may be printed in one printing operation. The sheet 146 is folded to provide said leaves 145 and rectangular sections 147 overlying the apertures of template 136 and containing holes 148 in registration with said apertures. To facilitate folding of the ballot sheet and also to permit securement of the same through the template 136 a cover plate 150 is provided which is formed with a plurality of longitudinally extending slots 151 that receive the leaves 145 therethrough. The strips of cover sheet 150 that are between slots 151 are provided with apertures 152 in registration with the holes 148 in the ballot sheet 146 and also in registration with the frustoconical holes 140 in template 136.

It will be seen that the above described modified form of the invention permits the incorporation of "write-ins" on the ballot pages and simplifies the base without any danger of the voter mutilating the record card which is removed subsequently after all assemblies have been collected.

One important advantage of the modified form of FIG. 18 and 19 is that the entire assembly may be reused except for the ballot sheet 146 that is formed into the leaves 145. However, it is a simple matter to fold ballot sheets for subsequent elections for use in the same template and with the same cover plate.

Although frustoconical apertures 140 are formed in the template 136 as representative of one form of the invention, it is preferable in most instances to employ apertures having cylindrical enlargements such as shown in FIG. 8. Also it is preferable to employ a stylus of the type shown in FIGS. 7, 8. The frustoconical shape has the effect of optically reducing the size of the image of the chip when the latter is viewed therethrough. Since the chips are relatively small in most cases, this results in the user, in many instances, having difficulty in noting the presence or absence of the chip if he desires to check his selections. By providing the cylindrical enlargement as shown in FIG. 8, all of the advantages accruing from countersinking the hole are retained and, at the same time, the true size of the chips is seen through the transparent template because of the flat planar bottom of the recess.

The invention also contemplates the printing of the record card with the chips having a color contrasting with the color of the remainder of the card. This assists the user in ascertaining the presence or absence of a chip.

The inner and outer templates which are used in combination to insure the accuracy required may be conveniently made of plastic; the outer template may be opaque but it is preferable that the inner template be formed of transparent material so that the chip of the record card may be viewed therethrough is desired. It is emphasized in this connection that the use of a cylindrical recess such as indicated at 73 in FIG. 8 is preferable to a frustoconical recess for guiding the stylus. Surprisingly enough, the image of the chip on the record card when viewed through the inner template formed with cylindrical recesses such as shown in FIG. 8 is about twice the reduced size image which results when the chip is viewed through a frustoconical recess. Since, of necessity, the chips of the record card must be small, any means for making them appear as large as possible contributes to the facility with which the device is used by the average person.

The present invention also contemplates the provision of a structure of the type herein described for use in checking a ballot card in addition to use in punching a ballot card. For example a frame similar to that indicated at 30 in FIG. 9 may be employed by voting authorities to determine quickly whether a punched card placed behind template 28 has been punched in a manner inconsistent with write-in selections made by a voter. Also the voter himself may employ such a frame to satisfy himself that the card has actually been punched in intended manner.

It will be seen that the above described invention permits the use of record cards in voting operations and the like in an extremely speedy and simple manner and achieves the advantages accruing from counting of the results by high speed electronic computers.

The invention incorporates numerous features that make the device adaptable to simplified voting operations and high speed counting by electronic computers. The fact that the record card itself properly positions the inner template relative to the fixed outer template (FIGS. 3, 4) makes erroneous voting impossible.

With respect to the structure of FIGS. 7, 8 it will be understood that the relatively large diameter upwardly opening recess 73 makes it easy for the user to insert therein the relatively large diameter cylindrical end 70 of the stylus. Furthermore, because of the geometry of the associated parts it is impossible for the relatively small diameter pin 65 to be disposed in any position except the correct position relative to the associated chip. In other words, the structure discourages and, in fact, makes impossible, the operation of the pin 65 in a position slantingly disposed relative to the plane of the card. For this reason complete punching out of the chip is insured.

It should be understood that the very specific forms of the invention described above are not to be taken as restrictive as it will be apparent to those skilled in the art that minor variations in design may be resorted to without departing from the scope of the following claims.

I claim:

1. In a device enabling a user to manually register data on a machine-processable record card having a plurality of index point areas:

a base, a pair of templates each provided with a plurality of apertures, said templates being formed with the apertures of one adapted to register with the apertures of the other and with said index point areas when said templates and card are positioned in superposed operative position, means mounting said templates together in a normal position with the apertures of one template offset from the corresponding apertures of the other and the index point areas of said card, and means for shifting one of said templates to bring said templates and card into said operative position.

2. A device according to claim 1 wherein said card shifts said one template to operative position when said card is moved to said operative position.

3. A device according to claim 1 wherein said card is formed with a positioning hole and said base is provided with a pin adapted to be received in said hole when said card is in operative position.

4. A device according to claim 1 wherein the apertures of said one template include upwardly opening recesses provided with planar bottoms.

5. In a device enabling a user to manually register data on a machine-processable record card provided with index point areas scored to provide removable chips:

a base, resilient die means carried by said base for supporting said card thereon and provided with openings adapted to receive such chips therethrough when the latter are punched from said card, an inner template adjacent said die means and positioned to permit insertion of a card between said inner template and said die means, an outer template on the opposite side of said inner template from said die means, said inner and outer templates being provided with corresponding apertures adapted to register respectively with each other and with the chips of said cards when said templates and card are in a superposed operative position, means mounting said templates together in a normal position with the apertures of one template offset from the corresponding apertures of the other, and means for shifting one of said templates to bring said templates and card into said operative position.

6. A device according to claim 5 wherein spring means is provided in engagement with said one template for urging it to said offset position, said one template being engageable by said card for shifting it to said normal position when said card is moved to operative position relative to said other template.

7. A device according to claim 5 wherein said card is provided with a positioning hole and said base is provided with a positioning pin adapted to be received in said positioning hole when said card is in operative position.

8. A device according to claim 7 wherein separate manually actuatable means is provided for shifting said one template to operative position when said card is in operative position.

9. In a device enabling a user to manually register data on a machine-processable record card provided with a plurality of index point areas arranged in parallel columns:

a base, means on said base mounting a plurality of leaves carrying reference indicia thereon for swinging movement about spaced parallel axes, an apertured template supported on said base, means on said base for supporting a record card with said columns of areas parallel to and interposed between said axes, the apertures in said template being positioned to register respectively with said areas when said template and card are in a superposed operative position, means mounting said template in a normal position with the apertures of said template offset from said areas, and means for shifting said template to said operative position.

10. A device of the character described for use with a record card formed with removable chips, an apertured template, means for removably securing a record card to said template with its chips in registration respectively with the apertures in said template, a plurality of leaves supported on said base for swinging about spaced parallel axes, said leaves being formed from a single sheet bent along parallel lines to form leaves and including rectangular sections of said sheet between said axes and sceured to said template.

11. A device according to claim 10 wherein a cover sheet is provided with parallel slots for receiving said leaves therethrough and said cover sheet is secured to said template with the portions between said slots overlying said rectangular sections, said portions and said sections being provided with apertures in registration with the apertures of said template.

References Cited by the Examiner

UNITED STATES PATENTS

| | | | |
|---|---|---|---|
| 2,307,281 | 1/1943 | Kraus | 30—358 |
| 2,713,905 | 7/1955 | Hartley | 30—358 |
| 2,923,452 | 2/1960 | Holovka | 225—93 |
| 3,007,620 | 11/1961 | Laframboise et al. | 225—93 |

WILLIAM W. DYER, Jr., *Primary Examiner.*

DONALD L. MAXSON, *Examiner.*